United States Patent
Yokota et al.

(10) Patent No.: US 7,228,131 B2
(45) Date of Patent: Jun. 5, 2007

(54) IPV6/IPV4 TUNNELING METHOD

(75) Inventors: Hidetoshi Yokota, Saitama (JP); Akira Idoue, Saitama (JP)

(73) Assignee: KDDI Corporation, Tokyo (JP)

( * ) Notice: Subject to any disclaimer, the term of this patent is extended or adjusted under 35 U.S.C. 154(b) by 97 days.

(21) Appl. No.: 11/214,892

(22) Filed: Aug. 31, 2005

(65) Prior Publication Data

US 2006/0046713 A1   Mar. 2, 2006

(30) Foreign Application Priority Data

Sep. 2, 2004   (JP)   ............................... 2004-255552

(51) Int. Cl.
*H04Q 7/20* (2006.01)
*H04Q 7/38* (2006.01)

(52) U.S. Cl. ............................... 455/426.1; 455/422.1; 455/466; 455/426.2; 455/403; 455/410; 455/411; 455/500; 370/312; 370/389; 370/392; 370/310; 370/328; 380/270; 380/31; 380/33; 380/247; 380/249

(58) Field of Classification Search ................ 455/403, 455/426.1, 426.2, 414.1, 422.1, 414.4, 410, 455/411, 445, 435.1, 435.2, 500; 370/517, 370/312, 389, 392, 310, 328; 380/463, 270, 380/31, 33, 247, 249
See application file for complete search history.

(56) References Cited

U.S. PATENT DOCUMENTS

2004/0088385 A1 *  5/2004  Blanchet et al. ............ 709/220
2004/0264465 A1 * 12/2004  Dunk ......................... 370/392
2005/0152298 A1 *  7/2005  Thubert et al. .............. 370/312
2006/0015590 A1 *  1/2006  Patil et al. ................... 709/220

OTHER PUBLICATIONS

F. Templin, et al., Intra-Site Automatic Tunnel Addressing Protocol (ISATAP) draft-ietf-ngtrans-isatap-22.txt, Networking Group, Internet-Draft, May 26, 2004, Expires: Nov. 26, 2004, pp. 1-14.

B. Carpenter, et al., "Connection of IPv6 Domains via IPv4 Clouds", Networking Group, Request for Comments: 3056, Category: Standards Track, Feb. 2001, pp. 1-23.

* cited by examiner

*Primary Examiner*—Keith Ferguson
(74) *Attorney, Agent, or Firm*—Westerman, Hattori, Daniels & Adrian, LLP.

(57) ABSTRACT

A mobile host MH and its home network HN correspond to both the Internet Protocol version 4 (IPv4) and the Internet Protocol version 6 (IPv6). An authentication server (RS) is accommodated in the home network HN. A corresponding host H corresponds to the IPv6 and is accommodated in the IPv6 network. In addition, a plurality of relay servers S1, S2 and S3 corresponding to both the IPv4 and the IPv6 are accommodated in the IPv6 network. The respective S1, S2 and S3 extract an IPv6 packet by decapsulating the IPv4 packet received from the mobile host MH via the IPv4 network, and transfers the relevant IPv6 packet to the corresponding host H via the IPv6 network.

2 Claims, 2 Drawing Sheets

IPV6/IPV4 TUNNELING METHOD

BACKGROUND OF THE INVENTION

1. Field of the Invention

The present invention relates to an IPv6/IPv4 tunneling method that transfers IPv6 packets by encapsulating the same by means of IPv4 packets in sections not corresponding to the IPv6 when carrying out communications among hosts matched to the IPv6.

2. Description of the Related Art

Operating systems and software that support the IPv6 (Internet Protocol Version 6) have become widespread, and utilization environments thereof have been fulfilled. However, the network still depends on the IPv4 base as the main stream. Therefore, there are many cases where even the hosts matched to the IPv6 are obliged to carry out communications on the basis of the IPv4.

As a tunneling technology ensuring IPv6 introduction in the IPv4-based network, ISATAP (Intra-Site Automatic Tunnel Addressing Protocol) is disclosed in non-patent documents 1 and 2. In the tunneling technology, when hosts matched to the IPv6 carry out communications on the basis of IPv6, the hosts transfer IPv6 packets by encapsulating the same by means of IPv4 packets in sections not corresponding to IPv6.

FIG. 3 is an exemplary view depicting one example of the tunneling technology. When a mobile host for which the home network (HN) is based on the IPv6 network is moved to another network (FN) corresponding to the IPv4 and carries out communications in IPv6 with a corresponding host existing on the HN, the mobile host converts IPv6 packets to IPv4 packets by encapsulating the IPv6 packets by means of an IPv4 header and transmits the same to a relay server. The relay server extracts the IPv6 packets by decapsulating the received IPv4 packets, and transmits the same to a corresponding terminal on the HN.

[Non-patent document 1] F: Templin, et al. "Intra-Site Automatic Tunnel Addressing Protocol (ISATAP)," draft-ietf-ngtrans-isatap-22. Txt. IETF, May 2004

[Non-patent document 2] B. Carpenter, et al, "Connection of IPv6 Domains via IPv4 Clouds," RFC3056, IETF, February 2001

In the prior art tunnel technology described above, there are the following technical problems.

(1) A mobile host must know the IP address of a relay server in advance.

(2) Where a plurality of relay servers are installed, it is desirable that the nearest relay server or a relay server whose load is light is chosen. However, it is not possible to choose an optimal relay server by the prior art technology.

(3) In order to securely carry out charging management by limiting utilization of relay servers to specified users, it is necessary for the mobile host and relay servers to share key information.

SUMMARY OF THE INVENTION

The invention provides an IPv6/IPv4 tunneling method, by which a mobile host can carry out communications to a corresponding host via a relay server without knowing the IP address of the relay server in advance and without sharing any key information at the mobile host and the relay server, capable of securely excluding or rejecting unauthenticated use of relay servers by a mobile host not having authorization.

The IPv6/IPv4 tunneling method according to the invention includes a mobile host connected to an IPv4 network and corresponding to the IPv6, a relay server connected to an IPv4 network and an IPv6 network and corresponding to the IPv4/IPv6, and a corresponding host connected to the IPv6 network and corresponding to the IPv6, in which the mobile host transmits an IPv6 packet addressed to a corresponding host to the IPv4 network by encapsulating the IPv6 packet by means of an IPv4 packet, and the relay server transmits the IPv6 packet to the corresponding host by decapsulating the IPv4 packet, and further includes an authentication server that is connected to the Ipv4/Ipv6 network and shares key information (K1) with the IPv6 mobile host.

And, in such a network, the IPv6/IPv4 tunneling method comprises the steps of: the mobile host acquiring an IPv4 address in the IPv4 network; the mobile host registering its own identification information (IDh) on an authentication request in which the IPv4 address is made into the source address, and transmitting the same to the authentication server; the authentication server generating a first random value (R1) in response to the authentication request and transmitting the same to the mobile host; the mobile host calculating a first hash value (h[R1,K1]) by using as parameters the first random value (R1) and its own key information (K1) in response to receiving of the first random value (R1); the mobile host generating a random key (K2); the mobile host transmitting the first hash value (h[R1,K1]) and the random key (K2) to the authentication server; the mobile host calculating a second hash value (h[K2,K1]) in which the random key (K2) and key information (K1) are used as parameters; the authentication server comparing the hash value (h[R1,K1]), in which the first random value (R1) and its own key information (K1) are used as parameters, with the first hash value and authenticating a mobile host on the basis of the result of comparison; the authentication server calculating a third hash value (h[K2,K1]), in which the random key (K2) transmitted from a mobile host and its own key information (K1) are used as parameters; the authentication server transmitting the third hash value (h[K2,K1]) and the identification information (IDh) of a mobile host to a relay server; the authentication server notifying the mobile host of the address of the relay server; the mobile host storing its own identification information (IDh) on utilization request and transmitting the same to the relay server; the relay server generating a second random value (R2) and transmitting the same to the mobile host; the mobile host calculating a fourth hash value (h[R2,h[K2,K1]]), in which the second hash value and the second random value are used as parameters, in response to receiving of the second random value (R2); the mobile host transmitting the fourth hash value (h[R2,h[K2,K1]]) to a relay server; and the relay server comparing the hash value (h[R2,h[K2,K1]]), in which the second random value (R2) and the third hash value are used as parameters, with the fourth hash value in response to receiving of the fourth hash value, and authenticating the mobile host on the basis of the result of comparison; wherein the relay server extracts an IPv6 packet by decapsulating the IPv4 packet received from the authenticated mobile host, and transmits the same to a corresponding host.

According to the invention, the following effects can be brought about.

(1) A mobile host is able to know an IP address of an optical relay server only by requesting authentication to an authentication server even if the mobile host does not know the IP address of the relay server in advance.

(2) Since the mobile host and the relay server can generate a random key in the process of authentication and share the key in safety, it becomes possible to carry out a secure and safe relay even if the mobile host and the relay server do not share the key information in advance.

(3) Since a feature of authenticating a mobile host is added to a relay server, an unauthorized mobile host can be prohibited from unauthenticated use of relay servers.

(4) Since a mobile host is prohibited from use other than a relay server selected by the authentication server, an optimal relay server can be utilized at all times.

DETAILED DESCRIPTION OF THE PREFERRED EMBODIMENT

Figure 1:
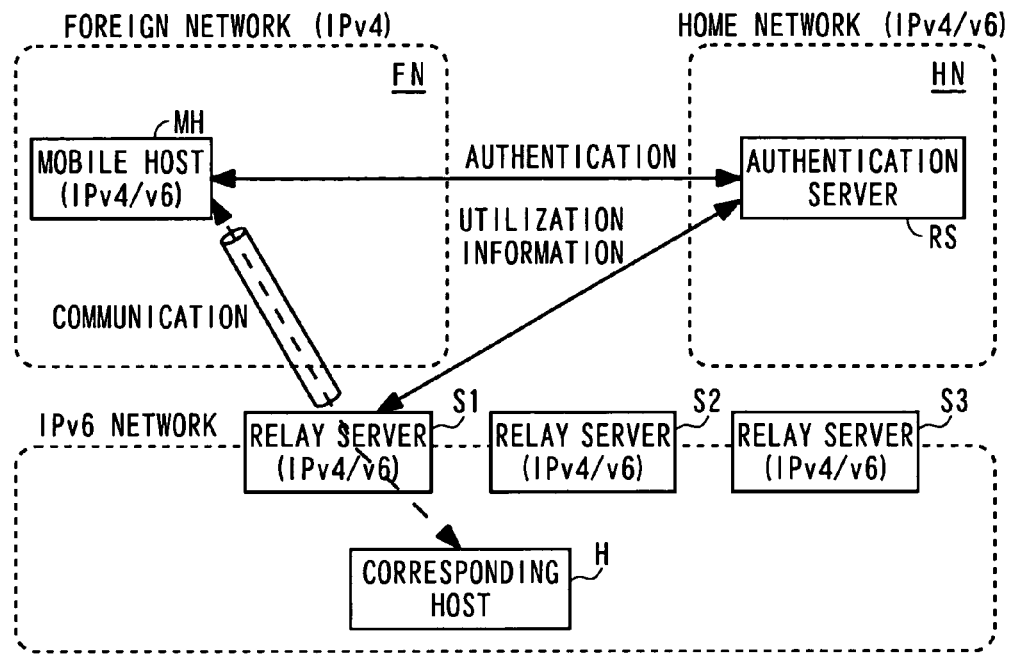
FIG. 1 is a view depicting a network configuration to which an IPv6/IPv4 tunneling method according to one embodiment of the invention is applied.
Figure 3:
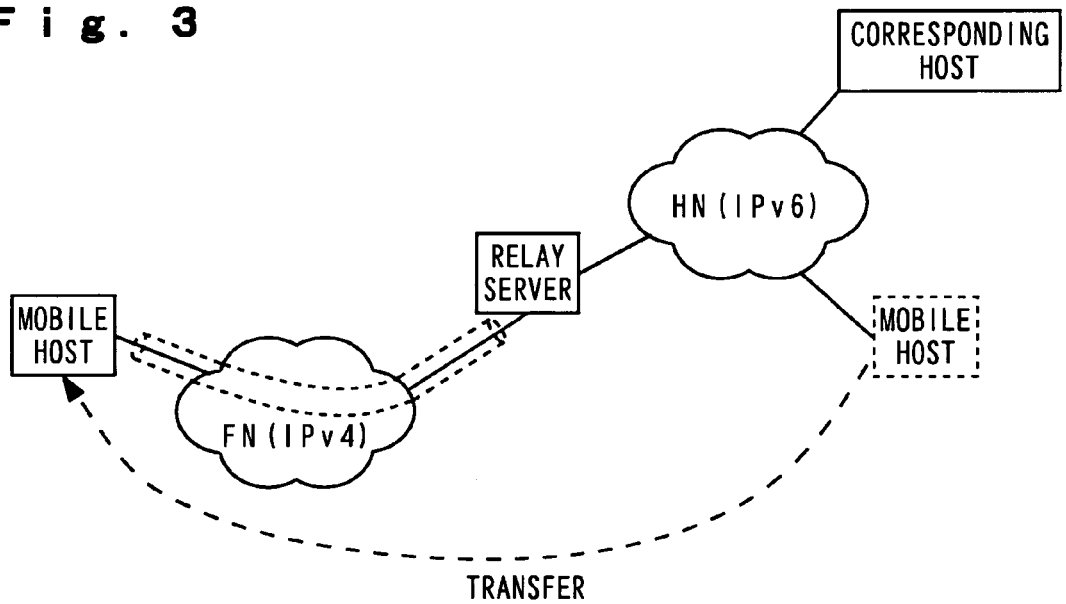
FIG. 3 is a schematic diagram depicting one example of a prior art tunneling technology.

FIG. 1 is a view depicting a network configuration to which an IPv6/IPv4 tunneling method according to one embodiment of the present invention is applied.

A mobile host (MH) and its home network (HN) correspond to both the Internet Protocol version 4 (IPv4) and the Internet Protocol version 6 (IPv6). An authentication server (RS) for authenticating an MH is accommodated in the HN. A corresponding host (H) that communicates with the MH corresponds to the IPv6 and is accommodated in the IPv6 network. A plurality of relay servers S1, S2 and S3 corresponding to both the IPv4 and the IPv6 are accommodated in the IPv6 network. The respective S1, S2 and S3 extract an IPv6 packet by decapsulating the IPv4 packet received from the MH via the IPv4 network, and transfer the IPv6 packet to the H via the IPv6 network.

Herein, a description is given of an example in which an MH moves from its own HN to a foreign network (FN) corresponding to the IPv4 and the MH carries out communications on the FN with a corresponding H via any one of the relay servers. Also, it is assumed, in the embodiment, that the MH acquires an IP address of an RS in advance, and the MH and the RS share key information K1 in advance.

Figure 2:
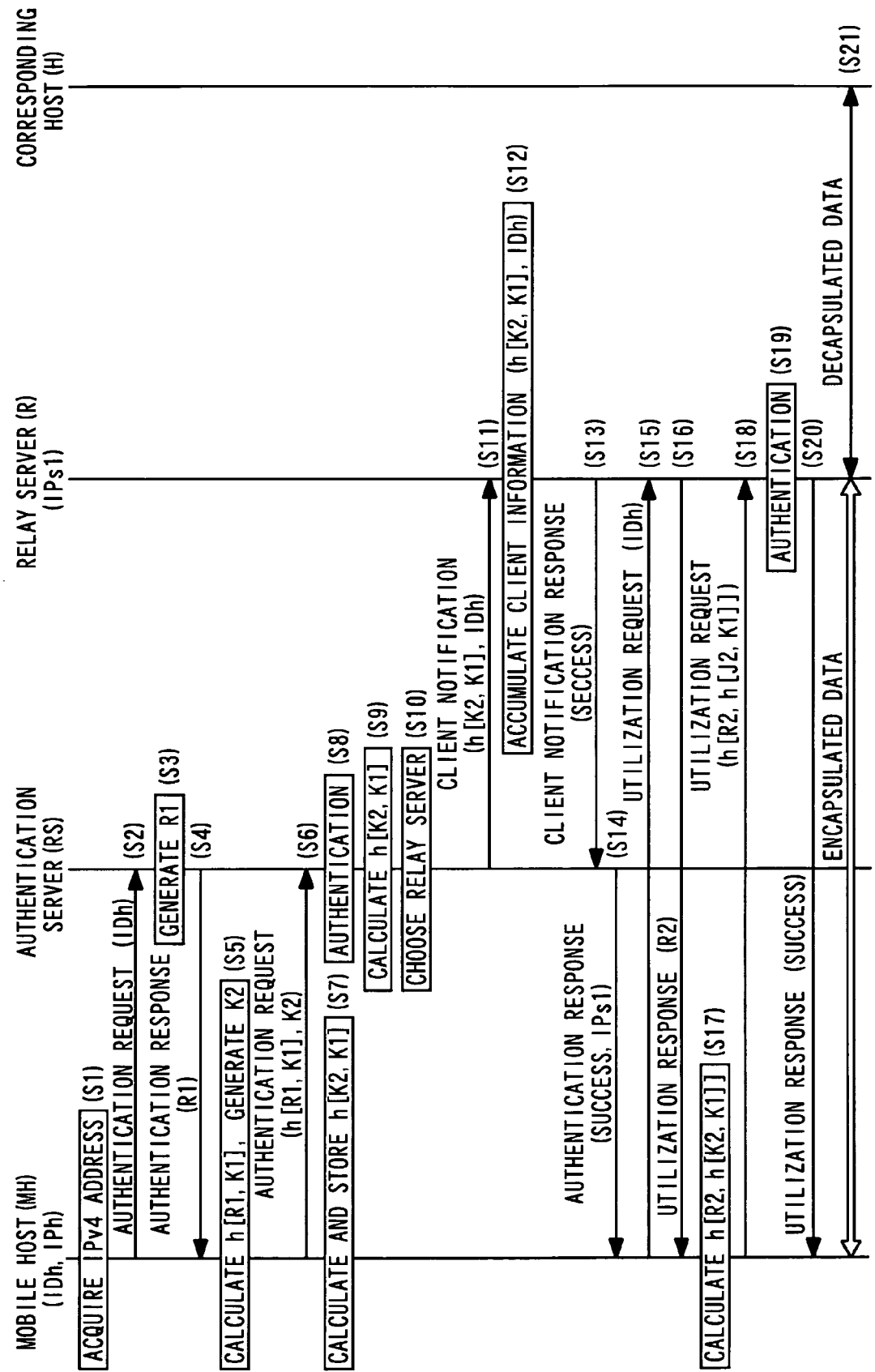
FIG. 2 is a view depicting an operation sequence of the present embodiment.

FIG. 2 is a view depicting an operation sequence according to the embodiment. In Step S1, the MH acquires an IPv4 address (IPh) on the FN by an appropriate method such as DHCP, etc. In Step S2, the MH stores the user name (IDh) of the MH in an authentication request, in which the IPv4 address (IPh) is made into the source address and the IP address of the RS is made into the destination address, and transmits the same. When the authentication request is received, the RS generates a random value R1 in Step S3. In Step S4, the random value R1 is stored in the authentication response to respond to the authentication request, and the random value R1 is transmitted to the MH.

When the MH receives the authentication response, in Step S5, the MH calculates the first hash value h[R1,K1] using the random value R1 registered in the authentication response and its own key information K1 as parameters. Further, random key information (hereinafter called as "random key") K2 is generated, and in Step S6, the MH stores the first hash value h[R1,K1] and random key K2 in the authentication request and transmits the same to the RS. In Step S7, the MH further calculates the second hash value h[K2,K1] using the random key K2 and its own key information K1 as parameters, and temporarily stores the same.

In Step S8, when the RS receives the authentication request, the RS calculates the hash value h[R1,K1] using the random value R1 and its own key information K1 as parameters, and the RS authenticates the MH on the basis of whether the hash value is agreed with the first hash value stored in the authentication request. When the authentication is cleared, in Step S9, the RS calculates the third hash value h[K2,K1] using its own key information K1 and the random key K2 stored in the authentication request as parameters.

In Step S10, the RS further chooses the nearest relay server or a relay server subjected to only slight load among a plurality of relay servers as the optimal relay server on the basis of the IPv4 address (IPh) of the MH. Here, a description is continued under the assumption that the relay server S1 has been selected. In Step S11, the third hash value h[K2,K1] and the user name (IDh) of the MH are stored in a client notification request, and the client notification request is transmitted to the selected relay server S1.

When the relay server S1 receives the client notification request, in Step S12, combinations of the user names (IDh) and the third hash values h[K2,K1], which are stored in the client notification request, are stored as client information. In Step S13, a client notification response is notified to the RS. When the RS receives the client notification response, in Step S14, the RS stores an IP address (IPs1) of the relay server S1 in the authentication response and transmits the same to the MH. When the MH receives the authentication response, in Step S15, the MH stores its own IP address (IPh) in a utilization request and transmits the same to the relay server S1.

When the relay server S1 receives the utilization request, in Step S16, the relay server S1 makes reference to the client information using the user name IDh stored in the packet as a retrieval key. And, if the relevant user name IDh has been already registered as client information, the relay server S1 stores a new random value R2 in the utilization response and transmits the same to the MH. When the MH receives the utilization response, in Step S17, the MH calculates the fourth hash value h[R2,h[K2,K1]] using the random value R2 stored in the relevant packet and the second hash value h[K2,K1] generated in the above step S7 as parameters. In Step S18, the MH stores the relevant fourth hash value h[R2, h[K2,K1]] in the utilization request and transmits the same to the relay server S1.

When the relay server S1 receives the utilization request, in Step S19, the relay server S1 calculates a hash value h[R2,h[K2,K1]] using the third hash value h[K2,K1] received in the above step S11 and the random value R2 transmitted in the above step S16 as parameters. And, the relay server S1 authenticates the MH based on whether the hash value is agreed with the fourth hash value stored in the utilization request. If the MH is authenticated, in Step S20, a utilization response of notifying the MH of authentication is transmitted to the MH.

As the authentication is completed as described above, in Step S21, the MH encapsulates the IPv6 packet addressed to the H on the IPv6 network by means of an IPv4 header in which its own IPv4 address (IPh) is made into the source address and the IPv4 address (IPs1) of the relay server S1 is made into the destination address, turns the IPv6 packet into an IPv4 packet, and transmits the same to the relay server S1. The relay server S1 decapsulates the received IPv4 packet and extracts the IPv6 packet, and transfers the same onto the IPv6 network.

What is claimed is:

1. An IPv6/IPv4 tunneling method including:
a mobile host connected to an IPv4 network and corresponding to the IPv6;
a relay server connected to an IPv4 network and an IPv6 network and corresponding to the IPv4/IPv6; and
a corresponding host connected to the IPv6 network and corresponding to the IPv6,
in which the mobile host transmits an IPv6 packet addressed to a corresponding host to the IPv4 network by encapsulating the IPv6 packet by means of an IPv4 packet, and the relay server transmits the IPv4 packet to the corresponding host by decapsulating the IPv4 packet,
further including: an authentication server that is connected to a IPv4/IPv6 network and shares key information (K1) with the IPv6 host; and
still further including the steps of:
the mobile host acquiring an IPv4 address in the IPv4 network;
the mobile host registering its own identification information (IDh) on an authentication request in which the IPv4 address is made into the source address, and transmitting the same to the authentication server;
the authentication server generating a first random value (R1) in response to the authentication request and transmitting the same to the mobile host;
the mobile host calculating a first hash value (h[R1,K1]) by using as parameters the first random value (R1) and its own key information (K1) in response to receiving of the first random value (R1);
the mobile host generating a random key (K2);
the mobile host transmitting the first hash value (h[R1, K1]) and the random key (K2) to the authentication server;
the mobile host calculating a second hash value (h[K2, K1]) in which the random key (K2) and key information (K1) are used as parameters;
the authentication server comparing a hash value (h[R1, K1]) in which the first random value (R1) and its own key information (K1) are used as parameters, with the first hash value and authenticating the mobile host on the basis of the result of comparison;
the authentication server calculating a third hash value (h[K2,K1]), in which the random key (K2) transmitted from the mobile host and its own key information (K1) are used as parameters;
the authentication server transmitting the third hash value (h[K2,K1]) and the identification information (IDh) of the mobile host to a relay server;
the authentication server notifying the mobile host of the address of the relay server;
the mobile host storing its own identification information (IDh) on utilization request and transmitting the same to the relay server;
the relay server generating a second random value (R2) and transmitting the same to the mobile host;
the mobile host calculating a fourth hash value (h[R2,h[K2,K1]]), in which the second hash value and the second random value are used as parameters, in response to receiving of the second random value (R2);
the mobile host transmitting the fourth hash value (h[R2, h[K2,K1]]) to a relay server; and
the relay server comparing the hash value (h[R2,h[K2, K1]]), in which the second random value (R2) and the third hash value are used as parameters, with the fourth hash value in response to receiving of the fourth hash value, and authenticating the mobile host on the basis of the result of comparison;
wherein the relay server extracts an IPv6 packet by decapsulating the IPv4 packet received from the authenticated mobile host, and transmits the same to a corresponding host.

2. The IPv6/IPv4 tunneling method according to claim 1, further including a plurality of relay servers;
wherein the authentication server selects a relay server based on an IPv4 address of the mobile host.

* * * * *